United States Patent
Li et al.

(10) Patent No.: US 11,420,906 B2
(45) Date of Patent: Aug. 23, 2022

(54) SYNERGISTIC DISPOSAL METHOD OF HAZARDOUS WASTE INCINERATION RESIDUES AND SOLID WASTES, CERAMSITE AND APPLICATION THEREOF

(71) Applicants: TIANJIN UNIVERSITY OF TECHNOLOGY, Tianjin (CN); YI KELI (TIANJIN) ENVIRONMENTAL PROTECTION TECHNOLOGY DEVELOPMENT CO., LTD., Tianjin (CN); TIANJIN YICHENG ENVIRONMENTAL CONTROL AND TESTING TECHNOLOGY CO., LTD., Tianjin (CN)

(72) Inventors: Meitong Li, Tianjin (CN); Wenjiao Yuan, Tianjin (CN); Ke Zhang, Tianjin (CN); Wenhao Fan, Tianjin (CN); Yuan Xu, Tianjin (CN); Youtian Zhang, Tianjin (CN)

(73) Assignee: TIANJIN YICHENG ENVIRONMENTAL CONTROL AND TESTING TECHNOLOGY CO., LTD., Tianjin (CN)

( * ) Notice: Subject to any disclaimer, the term of this patent is extended or adjusted under 35 U.S.C. 154(b) by 0 days.

(21) Appl. No.: 17/278,518

(22) PCT Filed: Mar. 20, 2020

(86) PCT No.: PCT/CN2020/080404
§ 371 (c)(1),
(2) Date: Mar. 22, 2021

(87) PCT Pub. No.: WO2021/073039
PCT Pub. Date: Apr. 22, 2021

(65) Prior Publication Data
US 2021/0323877 A1    Oct. 21, 2021

(30) Foreign Application Priority Data

Oct. 16, 2019 (CN) .......................... 201910982808.7

(51) Int. Cl.
| | | |
|---|---|---|
| C04B 35/622 | (2006.01) | |
| C04B 18/08 | (2006.01) | |
| C04B 18/10 | (2006.01) | |
| C04B 18/02 | (2006.01) | |

(52) U.S. Cl.
CPC ...... C04B 35/62204 (2013.01); C04B 18/027 (2013.01); C04B 18/08 (2013.01); *C04B 2235/5427* (2013.01); *C04B 2235/606* (2013.01); *C04B 2235/6567* (2013.01); *C04B 2235/77* (2013.01); *C04B 2235/96* (2013.01)

(58) Field of Classification Search
CPC ............ C04B 35/62204; C04B 18/027; C04B 18/0463; C04B 18/0472; C04B 18/08
See application file for complete search history.

(56) References Cited

U.S. PATENT DOCUMENTS

| | | | | |
|---|---|---|---|---|
| 10,894,741 | B2 * | 1/2021 | Lin | ..................... C04B 18/021 |
| 2004/0265202 | A1 * | 12/2004 | Chandran | ................. C01B 3/24 |
| | | | | 423/239.1 |
| 2012/0124893 | A1 * | 5/2012 | McRobbie | .............. C10L 10/00 |
| | | | | 44/280 |

FOREIGN PATENT DOCUMENTS

| | | | |
|---|---|---|---|
| CN | 105036707 A | | 11/2015 |
| CN | 107642786 A | | 1/2018 |
| CN | 108726989 A | * | 11/2018 |
| CN | 108726989 A | | 11/2018 |
| CN | 109503122 A | | 3/2019 |
| CN | 110723975 A | | 1/2020 |
| WO | WO-2018107660 A1 | * | 6/2018 ........... C04B 33/138 |

OTHER PUBLICATIONS

Chinese Patent Office, "Notice of Allowance for Chinese Patent Application No. 201910982808.7", dated Nov. 5, 2020, 1 page.
Chinese Patent Office, "Office Action for Chinese Patent Application No. 201910982808.7", dated Jul. 9, 2020, 4 pages.
Translation of the International Search Report dated Jul. 15, 2020 for international application No. PCT/CN2020/080404.

* cited by examiner

*Primary Examiner* — Karl E Group
(74) *Attorney, Agent, or Firm* — Eschweiler & Potashnik, LLC

(57) ABSTRACT

A synergistic disposal method of hazardous waste incineration residues and solid wastes, ceramsite and an application thereof, all belonging to the field of resources and environment. The disposal method includes the following steps: mixing of the hazardous waste incineration residues and solid wastes, granulation and dehydration of the resulting mixture and calcination to obtain ceramsite. In the preparation of ceramsite by the synergistic disposal of hazardous waste incineration residues and solid wastes as the raw materials, dioxin and organic matters in the hazardous waste incineration residues and solid wastes are decomposed, meanwhile the contained heavy metals are reduced and solidified, solving the disposal problem of hazardous waste incineration residues and solid wastes, saving a lot of land for landfills, decreasing the cost for comprehensive disposal, not producing new hazardous wastes, and reducing the burden of ecological environment.

4 Claims, No Drawings

SYNERGISTIC DISPOSAL METHOD OF HAZARDOUS WASTE INCINERATION RESIDUES AND SOLID WASTES, CERAMSITE AND APPLICATION THEREOF

This application is a national stage entry of PCT application PCT/CN2020/080404, filed Mar. 20, 2020, which in turn claims priority to Chinese Patent Application No. CN201910982808.7, entitled "SYNERGISTIC DISPOSAL METHOD OF HAZARDOUS WASTE INCINERATION RESIDUES AND SOLID WASTES, CERAMSITE AND APPLICATION THEREOF", filed with the China National Intellectual Property Administration on Oct. 16, 2019, the entire contents of each of these prior applications are incorporated herein by reference.

TECHNICAL FIELD

The present disclosure pertains to the technical field of resources and environment, and specifically pertains to as synergistic disposal method of hazardous waste incineration residues and solid wastes, ceramsite and an application thereof.

BACKGROUND During the incineration disposal of hazardous wastes, two kinds of solid waste residues will be produced in the incinerator, including slag and fly ash; wherein the slag from the incinerator is about 10~20 wt % of burning materials, which contains incombustible ingredients mainly including silicon, calcium, iron, inorganic salts and unburned carbides, and also contains dioxin, heavy metals and other toxic and harmful ingredients; the fly ash is mainly the solid wastes produced from the tail gas treatment, mainly including the dust coming out of the incinerator as well as activated carbon and calcium hydroxide used for absorbing dioxin and acidic gases, and the annual production of this part of hazardous wastes in China is about 4 million tons; Currently, the disposal method for the two kinds of hazardous wastes, slag and fly ash, is mainly landfill, which not only occupies a lot of land resources, but also requires significant maintenance cost, causing a tremendous burden to the society and the environment.

There are many kinds of solid wastes in China, commonly including coal ash, tailings, construction garbage, and sludge, the annual output of which is about several billion tons, and a large proportion of which have not been fully utilized, causing a great burden to the environment. Wherein, sludge is the byproduct of sewage after being treated by physical, chemical, physical-chemical or biological processes, which is an extremely complicated heterogeneous body consisting of organic debris, bacteria, inorganic particles and colloid. The main disposal way of sludge is sanitary landfill, which requires a large amount of land resources. Coal ash is the main solid waste discharged from coal-fired power plants, the main compositions of which are $SiO_2$, $Al_2O_3$, $FeO$, $Fe_2O_3$, $CaO$, $TiO_2$, etc. With the development of electrical industry, the emission of coal ash from coal-fired power plants is increasing year by year, which has become one of the industrial waste residues with large emissions currently in China. A large amount of coal ash without treatment will produce dust and pollute the atmosphere; if being discharged into the water system, the river will be silted up, and the toxic chemicals therein will cause harm to human and organisms. The output of tailings and construction garbage in China is huge, especially part of the industrial tailings have not been utilized properly.

Ceramsite is a kind of lightweight aggregate used in construction, having the characteristics of light weight, heat preservation, sound insulation, and environmental protection. It can be used, instead of the traditional broken stones and pebbles, to produce lightweight aggregate concrete products, such as hollow blocks and light weight boards. Ceramsite has become a high quality raw material for producing energy-saving wall materials or pouring light energy-saving walls on site. In recent years, the demand for ceramsite products has been increasing. At present, the raw materials for ceramsite production are mainly shale and clay. However, the resources of shale and clay are limited, the development of ceramsite industry has been greatly restricted.

SUMMARY

With respect to the problems of low utilization rate of hazardous waste incineration residues and solid wastes as well as limited raw material resources for the preparation of ceramsite, the present disclosure provides a synergistic disposal method of hazardous waste incineration residues and solid wastes, ceramsite and an application thereof.

To solve the above technical issues, the technical solution employed in the present disclosure is as below:

A synergistic disposal method of hazardous waste incineration residues and solid wastes, wherein, it includes the following steps:

The hazardous waste incineration residues are mixed with the solid wastes, and the resulting mixed materials are granulated, dried and calcined in turn to get ceramsite.

Preferably, the hazardous waste incineration residues include hazardous waste incineration slag and/or hazardous waste incineration fly ash;

The solid wastes include one or more of coal ash, sludge, oil-contained silt and metallurgical slag.

Preferably, the mixed materials are a mixture of hazardous waste incineration slag, hazardous waste incineration fly ash and coal ash, or a mixture of hazardous waste incineration slag and sludge, or a mixture of hazardous waste incineration slag and oil-contained silt, or a mixture of hazardous waste incineration slag, oil-contained silt and metallurgical slag.

Preferably, the mass ratio of silicon dioxide, alkaline matters and organic matters in the mixed materials is (40~70):(30~60):(0.5~10); and the alkaline matters include metal oxides and/or metal hydroxides.

Preferably, the metal element in metal oxides and/or metal hydroxides independently includes at least one of potassium, sodium, calcium, magnesium, aluminum, zinc and iron.

Preferably, the granular materials obtained after granulation have particle sizes of 5~85 mm.

Preferably, the resulting materials after drying have a water content of ≤5 wt %.

Preferably, the calcination temperature is 1000~1300° C., and the time is 10~60 min.

Preferably, the hot tail gas produced from calcination is used for drying.

Preferably, at the end of the calcination, the disposal method further includes cooling;

The way of cooling includes air cooling;

The hot air produced from air cooling is used for calcination.

The present disclosure provides ceramsite prepared by the synergistic disposal method of hazardous waste incineration residues and solid wastes described in the above technical solution.

The present disclosure also provides an application of the ceramsite described in the above technical solution as the raw material for building walls.

In the present disclosure, ceramsite is prepared with hazardous waste incineration residues and solid wastes as the raw materials, in which dioxin and other organic matters in the hazardous waste incineration residues and solid wastes are decomposed, meanwhile the contained heavy metals are reduced and solidified, solving the disposal problem of hazardous waste incineration residues and solid wastes, saving a lot of land for landfills, significantly decreasing the cost for comprehensive disposal, not producing new hazardous wastes, and reducing the burden of ecological environment, with significant economic and environmental benefits.

DETAILED DESCRIPTION

The present disclosure provides a synergistic disposal method of hazardous waste incineration residues and solid wastes, including the following steps:

The hazardous waste incineration residues are mixed with the solid wastes, and the resulting mixed materials are granulated, dried and calcined in turn to get ceramsite.

In the present disclosure, the hazardous waste incineration residues preferably include hazardous waste incineration slag and/or hazardous waste incineration fly ash. In the present disclosure, the hazardous waste incineration slag preferably includes the following components: 35~38 wt % of silicon dioxide, 55~58 wt % of metal oxides, 2~3 wt % of organic matters, totally 30 ppm of heavy metals(on the basis of Pb) and the remaining impurities. In the present disclosure, the hazardous waste incineration fly ash preferably includes the following components: 25~35 wt % of activated carbon and 65~75 wt % of calcium hydroxide.

In the present disclosure, the solid wastes preferably include one or more of coal ash, sludge and oil-contained silt. In the present disclosure, the coal ash preferably includes the following components: 65~75 wt % of silicon dioxide, 23~33 wt % of metal oxides and the remaining impurities. In the present disclosure, the sludge preferably includes the following components: 20~30 wt % of silicon dioxide, 13~22 wt % of metal oxides, 5~12 wt % of organic matters and the remaining water. In the present disclosure, the oil-contained silt preferably includes the following components: 33~43 wt % of silicon dioxide, 20~30 wt % of metal oxides, 5~12 wt % of organic matters and the remaining water.

In the present disclosure, the mass ratio of silicon dioxide, alkaline matters and organic matters in the mixed materials is preferably (40~70):(30~60):(0.5~10), more preferably (45~65):(35~55):(2~8), most preferably (50~60):(40~50):(4~6). In the present disclosure, the mass ratio of silicon dioxide, alkaline matters and organic matters is controlled within the above ranges, so as to ensure that the resulting ceramsite has excellent properties.

In the present disclosure, the alkaline matters are preferably metal oxides and/or metal hydroxides; the metal element in metal oxides and metal hydroxides independently and preferably includes at least one of potassium, sodium, calcium, magnesium, aluminum, zinc and iron; more preferably, the metal oxides include at least one of $Al_2O_3$, CaO, $Fe_2O_3$, FeO, $K_2O$, $Na_2O$, MgO and ZnO, more preferably include $Al_2O_3$, CaO and $Fe_2O_3$; and more preferably, the metal hydroxides include calcium hydroxide.

In the present disclosure, the mixed materials are preferably a mixture of hazardous waste incineration slag, hazardous waste incineration fly ash and coal ash, or a mixture of hazardous waste incineration slag and sludge, or a mixture of hazardous waste incineration slag and oil-contained silt, or a mixture of hazardous waste incineration slag, oil-contained silt and metallurgical slag. In the present disclosure, the amounts of hazardous waste incineration residues and solid wastes are preferably determined according to the mass ratio of silicon dioxide, alkaline matters and organic matters in the mixed materials. In the examples of the present disclosure, specifically, (1) when the mixed materials are a mixture of hazardous waste incineration slag, hazardous waste incineration fly ash and coal ash, the hazardous waste incineration slag includes the following components: 35 wt % of $SiO_2$, totally 30 ppm of heavy metals(on the basis of Pb), 25 wt % of CaO, 32 wt % of $Al_2O_3$, 3 wt % of organic matters and the remaining impurities; the hazardous waste incineration fly ash includes the following components: 30 wt % of activated carbon and 70 wt % of calcium hydroxide; and the coal ash includes the following components: 70 wt % of $SiO_2$, 12 wt % of CaO, 16 wt % of $Al_2O_3$ and the remaining impurities, wherein the mass ratio of hazardous waste incineration slag, hazardous waste incineration fly ash and coal ash is preferably 20:1:8;(2) when the mixed materials are a mixture of hazardous waste incineration slag and sludge, the hazardous waste incineration slag includes the following components: 35 wt % of $SiO_2$, totally 30 ppm of heavy metals (on the basis of Pb), 25 wt % of CaO, 32 wt % of $Al_2O_3$, 3 wt % of organic matters and the remaining impurities; and the sludge includes the following components: 25 wt % of $SiO_2$, 5 wt % of FeO, 11 wt % of $Al_2O_3$, 8 wt % of organic matters and the remaining water, wherein the mass ratio of hazardous waste incineration slag and sludge is preferably 1:2, and the mass of sludge is preferably on the basis of dry weight;(3) when the mixed materials are a mixture of hazardous waste incineration slag and oil-contained silt, the hazardous waste incineration slag includes the following components: 38 wt % of $SiO_2$, totally 40 ppm of heavy metals(on the basis of Pb), 26 wt % of CaO, 30 wt % of $Al_2O_3$, 2 wt % of organic matters and the remaining impurities, and the oil-contained silt includes the following components: 38 wt % of $SiO_2$, 2 wt % of FeO, 10 wt % of $Al_2O_3$, 12 wt % of CaO, 7 wt % of organic matters and the remaining water, wherein the mass ratio of hazardous waste incineration slag and oil-contained silt is preferably 1:2, and the mass of oil-contained silt is preferably on the basis of dry weight.

In the present disclosure, ceramsite is prepared with hazardous waste incineration residues and solid wastes as the raw materials, solving the disposal problem of hazardous waste incineration residues and solid wastes, saving a lot of land for landfills, significantly decreasing the cost for comprehensive disposal, not producing new hazardous wastes, and reducing the burden of ecological environment, with significant economic and environmental benefits.

In the present disclosure, the hazardous waste incineration residues are mixed with the solid wastes preferably by stirring. The present disclosure has no special limitation on the rotational speed and time of stirring, as long as it can ensure that the hazardous waste incineration residues are mixed with the solid wastes evenly.

The present disclosure has no special limitation on the equipment used for granulation, and any granulation equipment well known in the art can be used. In the present disclosure, the particle sizes of the granular materials obtained after granulation are preferably 5~85 mm, more preferably 10~50 mm, and most preferably 10~30 mm.

In the present disclosure, the drying temperature is preferably 80~500° C., more preferably 100~400° C., and most preferably 150~300° C.; the present disclosure has no special limitation on the drying time, as long as it can ensure that the resulting materials after drying have a water content of ≤5 wt %, specifically for example, drying for 10~30 min.

In the present disclosure, the calcination temperature is preferably 1000~1300° C., more preferably 1050~1250° C., and most preferably 1100~1200° C.; the calcination time is preferably 10~60 min, more preferably 15~40 min, and most preferably 20~30 min. The present disclosure has no special limitation on the calcination atmosphere, and any calcination atmosphere well known in the art can be used. In the present disclosure, the calcination is preferably conducted in a rotary calcinator; the main source of heat for calcination is preferably a heat source furnace; and the heat source furnace is preferably equipment that uses fire coal, biomass fuel or fuel gas to provide heat source. In the present disclosure, the hot tail gas produced during the calcination is preferably used for drying, and the tail gas after being recycled is deacidified to meet the emission standard and can be directly discharged into the atmosphere. The present disclosure has no special limitation on the specific operations of deacidification, and any deacidification processes well known in the art can be used.

In the present disclosure, during the calcination, dioxin and organic matters in hazardous waste incineration residues and solid wastes are decomposed, meanwhile the contained heavy metals are reduced and solidified, solving the disposal problem of hazardous waste incineration residues and solid wastes, saving a lot of land for landfills, significantly decreasing the cost for comprehensive disposal, not producing new hazardous wastes, and reducing the burden of ecological environment, with significant economic and environmental benefits. Moreover, the hot tail gas produced during the calcination can be recycled, thus saving energy resources and reducing the production cost of ceramsite.

At the end of calcination, the present disclosure preferably further includes cooling. In the present disclosure, the way of cooling preferably includes air cooling, and after the air cooling, it preferably also includes natural cooling or water cooling. In the present disclosure, the air temperature used for air cooling is preferably room temperature; the temperature of the resulting materials after air cooling is preferably 50~90° C.; and the hot air produced from air cooling is preferably used as an auxiliary heat source for calcination, thus realizing the recycling of energy resources, saving the energy resources and reducing the production cost of ceramsite. In the present disclosure, the water temperature for water cooling is preferably <40° C., more preferably 10~35° C.

The present disclosure provides ceramsite prepared by the synergistic disposal method of hazardous waste incineration residues and solid wastes described in the above technical solution. The piled density, the cylinder compressive strength and the water absorption of ceramsite prepared in the present disclosure all comply with relevant national standards of ceramsite (lightweight aggregates) (GB/T 17431.1-2010), with the characteristics of light weight, heat preservation, sound insulation, and environmental protection.

The present disclosure also provides an application of the ceramsite described in the above technical solution as the raw material for building walls. The ceramsite provided in the present disclosure is preferably used in hollow blocks and light weight boards, and is a high quality raw material for producing building wall materials or pouring light building walls on site.

The present disclosure will be further described in combination with the following examples.

EXAMPLE 1

It was determined that the hazardous waste incineration slag includes the following components in mass percentages: 35 wt % of $SiO_2$, totally 30 ppm of heavy metals(on the basis of Pb), 25 wt % of CaO, 32 wt % of $Al_2O_3$, 3 wt % of organic matters and the remaining impurities;

The hazardous waste incineration fly ash includes the following components in mass percentages: 30 wt % of activated carbon and 70 wt % of calcium hydroxide;

The coal ash includes the following components in mass percentages: 70 wt % of $SiO_2$, 12 wt % of CaO, 16 wt % of $Al_2O_3$ and the remaining impurities;

1000 kg hazardous waste incineration slag, 50 kg hazardous waste incineration fly ash and 400 kg coal ash were mixed evenly and transported to granulating equipment for granulation to get the granular materials, wherein the granular materials had particle sizes of 15~20 mm;

The granular materials were transported to rotary drying equipment and dried at 150° C. for 20 min; and the obtained dried materials have a water content of 3%;

The dried materials were transported into a calcinator and calcined at 1130° C. for 25 min; the hot tail gas produced from calcination was used for drying the granular materials, and the tail gas produced from drying was discharged after deacidification and other procedures;

The granules obtained after calcination were cooled in air to 55° C., and then cooled to room temperature naturally; the hot air produced from air cooling was used as an auxiliary heat source for calcination to get 1410 kg ceramsite.

EXAMPLE 2

The hazardous waste incineration slag includes the following components in mass percentages: 35 wt % of $SiO_2$, totally 30 ppm of heavy metals(on the basis of Pb), 25 wt % of CaO, 32 wt % of $Al_2O_3$, 3 wt % of organic matters and the remaining impurities;

The sludge includes the following components in mass percentages: 25 wt % of $SiO_2$, 5 wt % of FeO, 11 wt % of $Al_2O_3$, 8 wt % of organic matters and the remaining water;

1000 kg hazardous waste incineration slag, 2000 kg sludge (dry weight) were mixed evenly and transported to granulating equipment for granulation to get the granular materials, wherein the granular materials had particle sizes of 20~25 mm;

The granular materials were transported to rotary drying equipment and dried at 250° C. for 15 min; and the obtained dried materials have a water content of 1%;

The dried materials were transported into a calcinator and calcined at 1150° C. for 20 min; the hot tail gas produced from calcination was used for drying the granular materials, and the tail gas produced from drying was discharged after deacidification and other procedures;

The granules obtained after calcination were cooled in air to 60° C., and then cooled to room temperature naturally; the hot air produced from air cooling was used as an auxiliary heat source for calcination to get 2620 kg ceramsite.

EXAMPLE 3

The hazardous waste incineration slag includes the following components in mass percentages: 38 wt % of $SiO_2$, totally 40 ppm of heavy metals (on the basis of Pb), 26 wt % of CaO, 30 wt % of $Al_2O_3$, 2 wt % of organic matters and the remaining impurities;

The oil-contained silt includes the following components in mass percentages: 38 wt % of $SiO_2$, 2 wt % of FeO, 10 wt % of $Al_2O_3$, 12 wt % of CaO, 7 wt % of organic matters and the remaining water;

1000 kg hazardous waste incineration slag and 2000 kg oil-contained silt(dry weight) were mixed evenly and transported to granulating equipment for granulation to get the granular materials, wherein the granular materials had particle sizes of 10~15 mm;

The granular materials were transported to rotary drying equipment and dried at 280° C. for 10 min; and the obtained dried materials have a water content of 2%;

The dried materials were transported into a calcinator and calcined at 1150° C. for 20 min; the hot tail gas produced from calcination was used for drying the granular materials, and the tail gas produced from drying was discharged after deacidification and other procedures;

The granules obtained after calcination were cooled in air to 50° C., and then cooled to room temperature naturally; the hot air produced from air cooling was used as an auxiliary heat source for calcination to get 2640 kg ceramsite.

TEST EXAMPLE

The piled density and cylinder compressive strength of ceramsite prepared in Examples 1~3 were tested according to GB/T 17431.1-2010 Lightweight Aggregates and Its Test Methods-Part 1, and the water absorption of ceramsite prepared in Examples 1~3 were tested according to GB/T 17431.1-2010 Lightweight Aggregates and Its Test Methods-Part 2, with the test results shown in Table 1.

TABLE 1

| Performance test results of ceramsite prepared in Examples 1-3 | | | |
| --- | --- | --- | --- |
| Test Items | Example 1 | Example 2 | Example 3 |
| Piled density (kg/m³) | 600 | 400 | 360 |
| Cylinder compressive strength (MPa) | 3.5 | 1.5 | 1.6 |
| Water absorption (%) | 8.3 | 17.4 | 15.0 |

It can be seen from Table 1 that, ceramsite prepared in the present disclosure complies with relevant national standards of lightweight aggregates (GB/T 17431.1-2010).

The description of the above examples is intended only to assist in understanding the method and core concept of the present disclosure. It should be noted that several improvements and modifications can be made to the present disclosure by the persons with ordinary skills in the art without deviating from the principle of the present disclosure, all of which also fall within the protection scope of claims of the present disclosure. Various modifications to these examples are apparent to technical personnel in the art. General principles defined herein can be realized in other examples without deviating from the spirit or scope of the present disclosure. Therefore, the present disclosure shall not be confined to these examples set forth herein, but shall conform to the widest scope consistent with the principle and novel features disclosed herein.

What is claimed is:

1. A disposal method of hazardous waste incineration residues and solid wastes, consisting of the following steps:
    the hazardous waste incineration residues are mixed with the solid wastes, and the resulting mixed materials are granulated, dried, calcined, and air cooled in turn to get ceramsite;
    wherein, the hazardous waste incineration residues comprise hazardous waste incineration slag and/or hazardous waste incineration fly ash;
    the solid wastes comprise one or more of coal ash, sludge, oil-contained silt and metallurgical slag;
    a mass ratio of silicon dioxide, alkaline matters and organic matters in the mixed materials is (40-70):(30-60):(0.5-10); and the alkaline matters comprise metal oxides and/or metal hydroxides;
    a hot tail gas produced from calcination is used for drying; a hot air produced from air cooling is used for calcination.

2. The disposal method according to claim 1, wherein, the granular materials obtained after granulation have particle sizes of 5-85 mm.

3. The disposal method according to claim 1, wherein, the resulting materials after drying have a water content of ≤5 wt %.

4. The disposal method according to claim 1, wherein, the mixed materials after being dried are calcined at a temperature of 1000-1300° C. for 10-60 min.

* * * * *

UNITED STATES PATENT AND TRADEMARK OFFICE
CERTIFICATE OF CORRECTION

PATENT NO. : 11,420,906 B2
APPLICATION NO. : 17/278518
DATED : August 23, 2022
INVENTOR(S) : Meitong Li et al.

It is certified that error appears in the above-identified patent and that said Letters Patent is hereby corrected as shown below:

On the Title Page

Item (73) Assignee: Please add the following 2 additional assignees:
1. TIANJIN UNIVERSITY OF TECHNOLOGY, Tianjin (CN)
2. YI KELI (TIANJIN) ENVIRONMENTAL PROTECTION TECHNOLOGY DEVELOPMENT CO., LTD., Tianjin (CN)

Signed and Sealed this
Twenty-second Day of November, 2022

Katherine Kelly Vidal
*Director of the United States Patent and Trademark Office*